(12) United States Patent
Cluggish

(10) Patent No.: US 6,408,489 B1
(45) Date of Patent: Jun. 25, 2002

(54) COLLATED AND LUBRICATED FASTENERS AND LUBRICATION STATION

(75) Inventor: Raymond F. Cluggish, Indianapolis, IN (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 09/553,065

(22) Filed: Apr. 20, 2000

(51) Int. Cl.[7] .................................................. F16B 45/00
(52) U.S. Cl. .................. 24/20 CW; 206/340; 24/703.1; 24/27
(58) Field of Search ................... 206/340; 24/20 CW, 24/20 W, 27, 30.5 W, 115 A, 129 W, 703.1

(56) References Cited

U.S. PATENT DOCUMENTS

| 767,026 A | | 8/1904 | White |
|---|---|---|---|
| 2,167,063 A | | 7/1939 | Brand |
| 2,893,516 A | | 7/1959 | Bocchino |
| 3,078,533 A | * | 2/1963 | Allen |
| 3,195,681 A | | 7/1965 | Hirata |
| 3,427,170 A | * | 2/1969 | Schroeder |
| 3,506,116 A | * | 4/1970 | Winters |
| 3,640,317 A | * | 2/1972 | Panfili |
| 3,830,089 A | | 8/1974 | Boyd et al. |
| 4,612,128 A | * | 9/1986 | Uematsu et al. |
| 4,655,222 A | * | 4/1987 | Florez et al. |
| 4,791,014 A | * | 12/1988 | West |
| 4,901,820 A | | 2/1990 | Fry et al. |
| 5,086,921 A | | 2/1992 | Neff |
| 5,123,273 A | | 6/1992 | Kawabata |
| 5,709,124 A | | 1/1998 | Murayama |
| 6,086,304 A | * | 7/2000 | Hujishima et al. |

* cited by examiner

Primary Examiner—James R. Brittain
(74) Attorney, Agent, or Firm—Pillsbury Winthrop LLP

(57) ABSTRACT

A fastener for use with a crimping tool comprising a length of fastener metal wire bent into a generally C-shaped configuration to form an open ring fastener. The open ring fastener includes spaced opposed curved free end portions integrally interconnected by a central connecting portion. The open ring fastener is to be (1) positioned in an installation position with respect to elongated elements to be connected together disposed between the spaced opposed free ends thereof, and (2) crimped by a pair of closing jaws of the crimping tool into a close ring formation in surrounding relation to the elongated elements wherein the free ends are lapped with respect to sections of the connecting portion. The open ring fastener has a dry lubricant film on exterior surfaces of the curved free ends which slide with respect to the closing jaws when the open ring fastener is crimped so as to reduce the force required to effect the crimping movement.

18 Claims, 5 Drawing Sheets

COLLATED AND LUBRICATED FASTENERS AND LUBRICATION STATION

FIELD OF THE INVENTION

The present invention relates to fasteners and more particularly to fasteners of a generally C-shaped configuration for use with a crimping tool.

BACKGROUND OF THE INVENTION

Fasteners of the type herein contemplated comprise a length of metal wire bent into a generally C-shaped configuration to form an open ring fastener. The fasteners include spaced opposed curved free end portions interconnected by an arcuate central connecting portion.

The fasteners are typically a package comprising a row of abutting open ring fasteners. A structure which adheres the fasteners into the row comprises a tape that is bonded to the exterior surfaces of the connecting portions of the row of fasteners in order to package them.

There are several known crimping tools for bending these fasteners into a close ring formation. The U.S. Pat. No. 4,890,474, for example, discloses a clamping type tool for C-shaped fasteners. The premise behind these tools is to position a leading fastener of the fastener package, fed along a track feed of the tool, in an installation position wherein the elongated elements to be connected together are disposed between the spaced free ends thereof. The fastener is then crimped by a pair of pneumatically or manually operated closing jaws of the tool into a close ring formation in surrounding relation to the elongated elements. Because the ring configuration is to be transformed from a C-shape into a circular ring, special forming channels are provided in the front end of the upper and lower jaws. While the jaws are being closed, the free ends of the fastener are forced to slide along the forming channels in the jaws moving in a direction along the longitudinal extent of the fastener. These channels forcefully guide the fastener into the finished circular shape during closure. The channels are slightly offset so as the fastener is deformed, the free ends of the fastener are laterally deflected to move in a lapping relationship with respect to sections of the connecting portion. As the jaws are moved through the closing cycle, the connecting portion of the fastener comes into contact with a support structure that is designed to support the back of the fastener to ensure a circular shaped closure.

These fasteners have many different applications. They are well suited for joining together fabric, wire structures, such as marine lobster and crab traps, and various types of netting. They are particularly useful for constructing and maintaining Gabion structures that are used for earth retaining and erosion control projects. These structures must be assembled on site by first joining separate panels together into a box shape and then subsequently joining the box shaped units together into the desired structure which is then filled with river shingle or quarry stones.

Most all applications require that the fasteners have a minimum pull-open resistance. Due to this requirement, medium to high tensile wire is used to produce the fasteners. As the wire tensile force increases, there is a proportional increase in the force required to form the ring. For manual tools, this obviously makes the tool more difficult to operate. Moreover, because of this elevated force, associated frictional issues cause an unexpected high rate of erosion of the forming channels of the tool jaws. Components associated with the jaws' closure such as jaw bushings and rollers are also affected along with the jaws. As the erosion progresses, the shape of the closed ring is affected. Normally when the ring shape is changed, a resultant decrease in ring pull open force is seen. There are some applications where the ring pull-open force needs to be controlled. The reason for the needed control is that the applied rings are many times part of a structural assembly, such as the Gabion structures noted above. These assemblies place a tensile force on the closed ring. When the ring reaches the tensile fail point, the structure being supported by the closed rings can fail.

There is a need to reduce the excessive wear on crimping tool components, particularly the jaws, which reduces the life cycle of the tool.

Along with the tool part wear issues, as the wear increases the rings being formed by the tool can be deformed during ring closure. A reduction of the force required by manual tool users to form the rings would also be beneficial.

SUMMARY OF THE INVENTION

It is an object of the present invention to meet the above-described need. In accordance with the principles of the present invention, this objective is achieved by providing a fastener for use with a crimping tool comprising a length of fastener metal wire bent into a generally C-shaped configuration to form an open ring fastener. The open ring fastener includes spaced opposed curved free end portions integrally interconnected by a central connecting portion. The open ring fastener is to be (1) positioned in an installation position with respect to elongated elements to be connected together disposed between the spaced opposed free ends thereof, and (2) crimped by a pair of closing jaws of the crimping tool into a close ring formation in surrounding relation to the elongated elements wherein the free ends are lapped with respect to sections of the connecting portion. The open ring fastener has a dry lubricant film on exterior surfaces of the curved free ends which slide with respect to the closing jaws when the open ring fastener is crimped so as to reduce the force required to effect the crimping movement.

As the fasteners are typically a package, the objective of the present invention is also achieved by providing a fastener package comprising a row of abutting open ring fasteners each formed of a length of fastener metal wire bent into a generally C-shaped configuration that includes spaced opposed curved free end portions integrally interconnected by a central connecting portion. Structure adhering the row of open ring fasteners in abutting relation so as to be fed in the direction of the row along a crimping tool feed track to present a leading open ring fastener for crimping between closing crimping tool jaws into a closed ring formation wherein the free ends are lapped with respect to sections of the connecting portion. The row of open ring fasteners has a dry lubricant film on exterior surfaces of the curved free ends of the fasteners of the row.

The present invention also provides an apparatus for applying a lubricant to an adhered row of abutting open ring fasteners cut into predetermined lengths made in a mechanism which moves the row along a predetermined final path in an elevated temperature condition. The apparatus comprises a guide structure extending from the path to guide the adhered row of abutting open ring fasteners past a lubricant applying station. A lubricant applying assembly at the lubricant applying station has structure to apply a wet solution of a lubricant as a thin film on exterior surfaces of a pair of spaced curved free ends of the ring fasteners as they move past the assembly while still at the elevated temperature condition which aids in drying the lubricant.

Another aspect of the invention is providing a method of making fastener packages comprising: moving an adhered row of abutting open ring fasteners cut into predetermined lengths past a lubricant applying station, applying a wet solution of a lubricant as a thin film on exterior surfaces of a pair of spaced curved free ends of the ring fasteners as they move past the lubricant applying station, and causing the wet solution to dry on the applied surfaces of the fasteners.

These and other objects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF THE INVENTION

Figure 1:
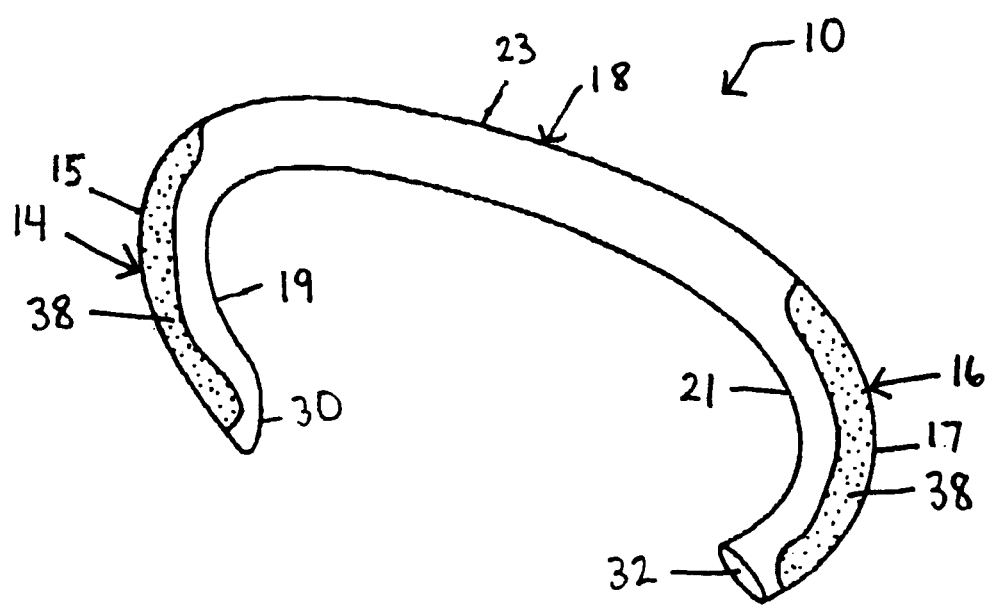
FIG. 1 is a perspective view of a fastener constructed in accordance with the principles of the present invention.
Figure 2:
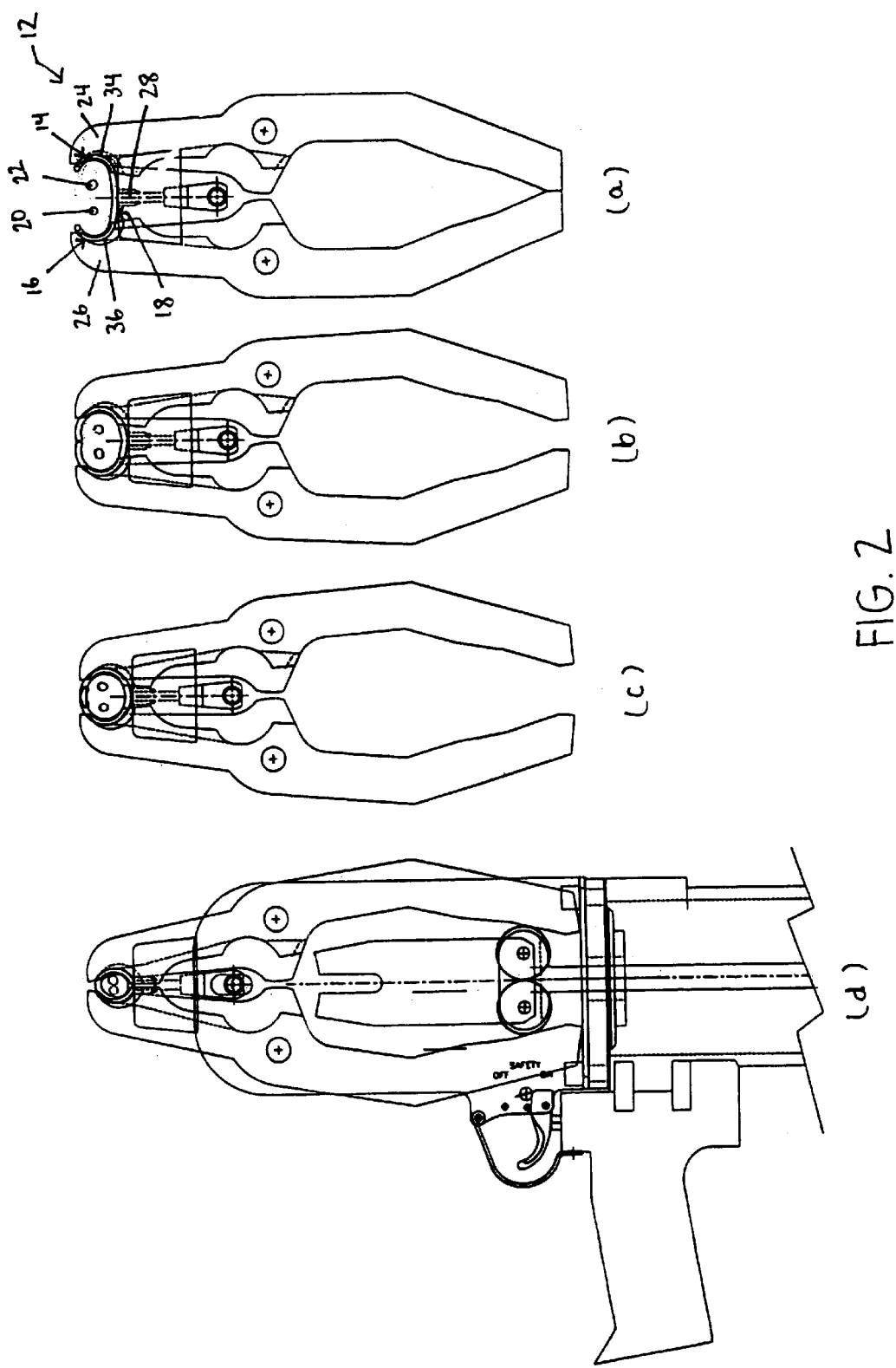
FIG. 2 is a sequential view of a well-known crimping tool crimping the fastener of FIG. 1 into a close ring in surrounding relation to elongated elements to be connected together.

FIG. 1 shows a fastener generally indicated at 10, in the form of an open ring fastener, which embodies the principles of the present invention. The fastener 10 is configured for use with a crimping tool, generally indicated at 12 as shown in FIG. 2. Such crimping tools are generally well-known in the art. The fastener 10 is formed of a length of fastener metal wire bent into a generally C-shaped configuration to form an open ring fastener. The fastener 10 includes spaced opposed curved free end portions, generally shown at 14, 16, that are integrally interconnected by an arcuate central connecting portion, generally shown at 18. The fastener metal wire is preferably a high tensile carbon steel, but stainless steel and aluminum alloys are also contemplated.

Referring now more particularly to the sequential illustration of FIG. 2, the fastener 10 is to be positioned in an installation position, shown in FIG. 2(a), by the crimping tool 12 wherein a pair of elongated elements 20, 22 to be connected together are disposed between the spaced opposed free ends 14, 16 thereof. Then, the fastener 10 is crimped by a pair of closing jaws 24, 26 of the crimping tool 12 as described in the background and shown sequentially from FIG. 2(a) to FIG. 2(d). The central connecting portion 18 of the fastener 10 is supported by a support structure 28 of the crimping tool 12 to prevent the connecting portion 18 of the fastener 10 from deforming through the crimping movement. The fastener 10 is crimped into a closed ring formation is surrounding relation to the elongated elements 20, 22 wherein the free ends 14, 16 are lapped with respect to sections of the connecting portion 18, as exemplified in FIG. 3. The free ends 14, 16 have oppositely angled end surfaces 30, 32 preferably at 45° angles, as shown in FIG. 1. This ensures that the free ends 14, 16 will slide by one another into a lapping relationship if they happen to abut during the crimping movement. As stated in the background, a pair of jaw channels 34, 36 of the jaws 24, 26 in FIG. 2 are slightly offset to prevent this from happening. It is also contemplated that the fastener ends be blunt, angled, or offset.

In accordance with the principles of the present invention, the open ring fastener 10 has a dry lubricant film 38 applied on exterior surfaces 15, 17 of the curved free ends 14, 16 which slide with respect to the closing jaws 24, 26 when the fastener 10 is crimped so as to reduce the force required to effect the crimping movement. For example, a well-known pneumatically operated crimping tool which previously required 120 psi of air pressure to crimp a C-shaped fastener would now be able to crimp a lubricated fastener of the type herein contemplated with only 70 psi of air pressure. The lubricant 38 also reduces the wear and erosion of the tool jaws 24, 26 caused by friction as described in the background section. Over time, some of the lubricant will transfer to the tool jaws 24, 26 which will also help in lubrication.

Figure 3:
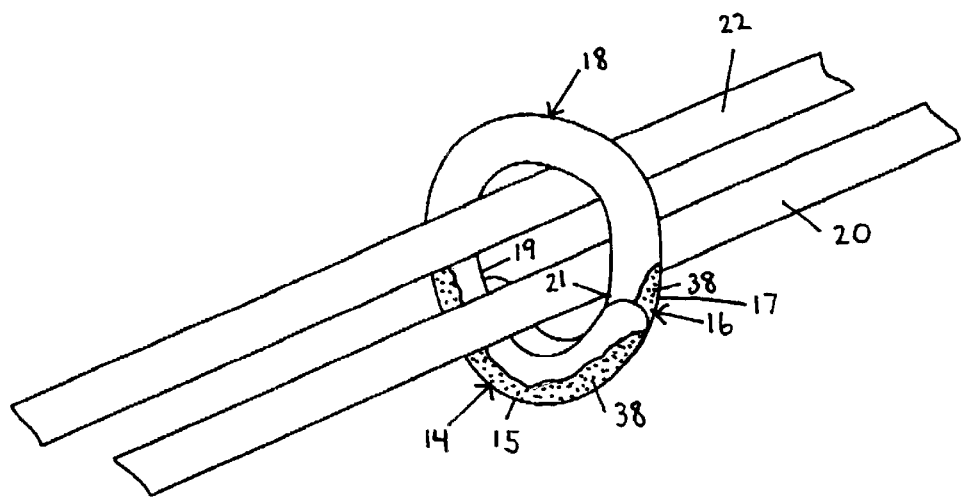
FIG. 3 is a perspective view showing the fastener of FIG. 1 as a close ring in surrounding relation to elongated elements to be connected together.

The lubricant 38 is applied only on exterior surfaces 15, 17 of the curved free ends 14, 16. FIG. 1 shows the general area on the fastener 10 on which the lubricant 38 is applied to more clearly illustrate the principles of the present invention. If the lubricant 38 was applied on interior surfaces 19, 21 of the curved free ends 14, 16, a reduction in friction in the contact area that is tensiled could in certain applications dramatically reduce the force required to open the ring. It is preferable that the lubricant not be applied on the interior surfaces 19, 21. FIG. 3 shows the preferable close ring formation in surrounding relation to the elongated elements 20, 22 with the lubricant 38 on the exterior surfaces 15, 17 of the free ends 14, 16.

The application of the lubricant 38 will, depending on work area environmental issues, for example dust, gravel, sand, and mud, etc, extend the service life of the tool jaws 24, 26 by up to 20%. Additional improvements in the service life of other tool components, such as jaw bushings and rollers, should also be realized due to the lessened force needed to close the fasteners 10. Although many types of lubricant could be used, the preferred type is a dry film, high-pressure lubricant, such as molybdenum disulfide. Generally, dry film lubricants are applied wet and bond to the host material when dried. Molybdenum disulfide is the preferred lubricant as it provides lubrication up to 100,000 psi between the load bearing surfaces, although Graphite, PTFE, and Silicone are contemplated. Molybdenum disulfide is placed in suspension for this application by odorless mineral spirits, although it could also be water borne.

METHOD OF MANUFACTURE

Figure 4:
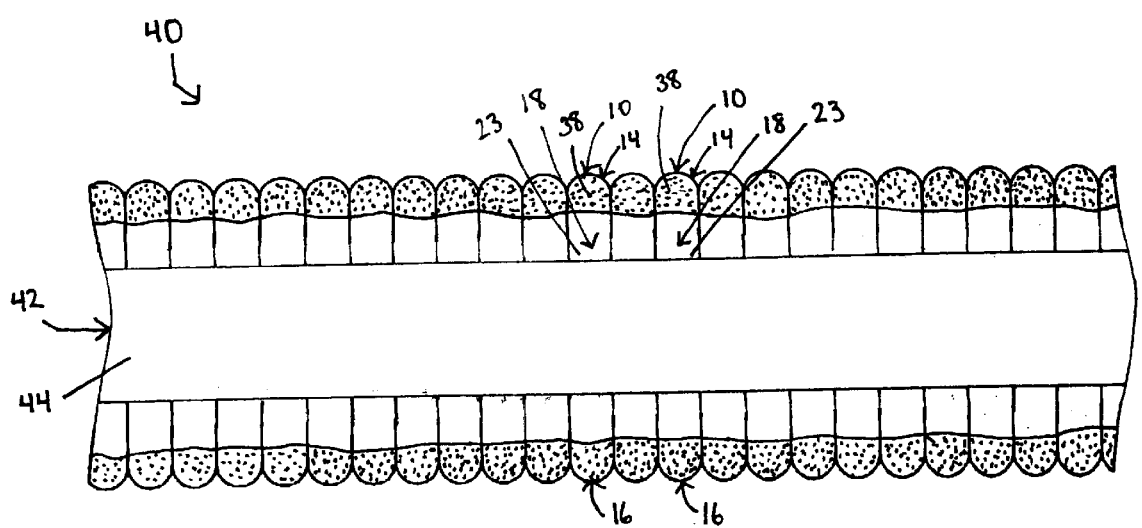
FIG. 4 is a top view of a fastener package constructed in accordance wit h the principles of the present invention.

The fasteners 10 are manufactured as a fastener package, shown generally at 40 in FIG. 4, comprising an adhered row of abutting open ring fasteners 10 so as to be fed in the direction of the row along a crimping tool feed track to present a leading open ring fastener for crimping between closing crimping tool jaws into a closed ring formation. A structure, shown generally at 42 adheres the row of open ring fasteners 10 in abutting relation. The structure 42 comprises a tape 44 that is bonded to an exterior surface 23 of each connecting portion 18 of the row of fasteners 10 in order to package the fasteners. The tape 44 is preferably made of polyester including a heat sensitive layer which is heat activated to bond to the aforesaid surface 23 of the connecting portion 18.

In accordance with the principles of the present invention, the application of the dry lubricant film 38 on exterior surfaces 15, 17 of the curved free ends 14, 16 of the fasteners 10 is preferably done after the fasteners 10 have been packaged. Therefore, the application does not create any interferences or changes in the package manufacturing process.

Figure 5:
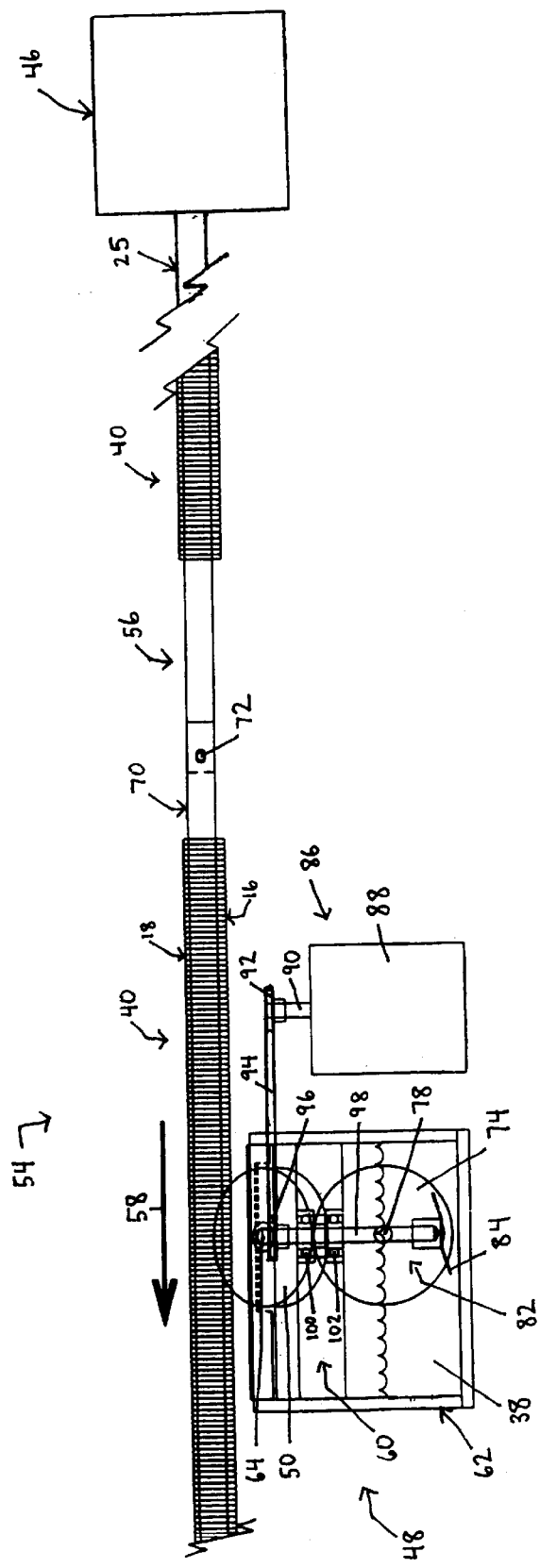
FIG. 5 is a side view of an apparatus for applying lubricant to a fastener package and also shows a mechanism for packaging fasteners.

A mechanism, generally shown in FIG. 5 at 46, packages the fasteners 10 into the fastener package 40. This mechanism 46 collates the fasteners 10 into the row, heats the row of fasteners, applies the tape 44 including the heat sensitive layer, and cuts the adhered row of abutting open ring fasteners 10 into predetermined lengths to make the package 40. The package 40 is then moved out of the mechanism 46 along a predetermined final path, shown generally at 25, in an elevated temperature condition. The present invention facilitates the process of lubricating the fasteners 10 by utilizing the motion out of the adhering mechanism 46 to guide the package 40 past a lubricant applying station, shown generally at 48. The elevated temperature condition of the package 40 as it moves out of the adhering mechanism 46 also facilitates the drying process of the lubricant 38 on the exterior surfaces 15, 17 of the pair of free ends 14, 16 of the fasteners 10.

In its broadest aspects, the method of the invention comprises moving the adhered row of abutting open ring fasteners 10 cut into predetermined lengths in the form of the package 40 past the lubricant applying station 48. A wet solution of the lubricant 38 is applied as a thin film on exterior surfaces 15, 17 of the pair of spaced curved free ends 14, 16 of the fasteners 10 as they move past the lubricant applying station 48, and causing the wet solution to dry on the applied surfaces 15, 17 of the fasteners 10. The method includes that the lubricant 38 is rolled on exterior surfaces 15, 17 of the pair of free ends 14, 16 by a pair of lubricant applying rollers 50, 52. The method further includes that the package 40 is moved past the applying station 48 at an elevated temperature condition which aids in drying the lubricant 38 applied thereto.

Dry film lubricants can be applied as a wet solution by several processes. Some of the options are spray coating, brush coating, bath coating, and roll coating. Roll coating is the preferred process for application on fastener packages as roll coating can apply the lubricant to very specific areas of the host material.

Figure 6:
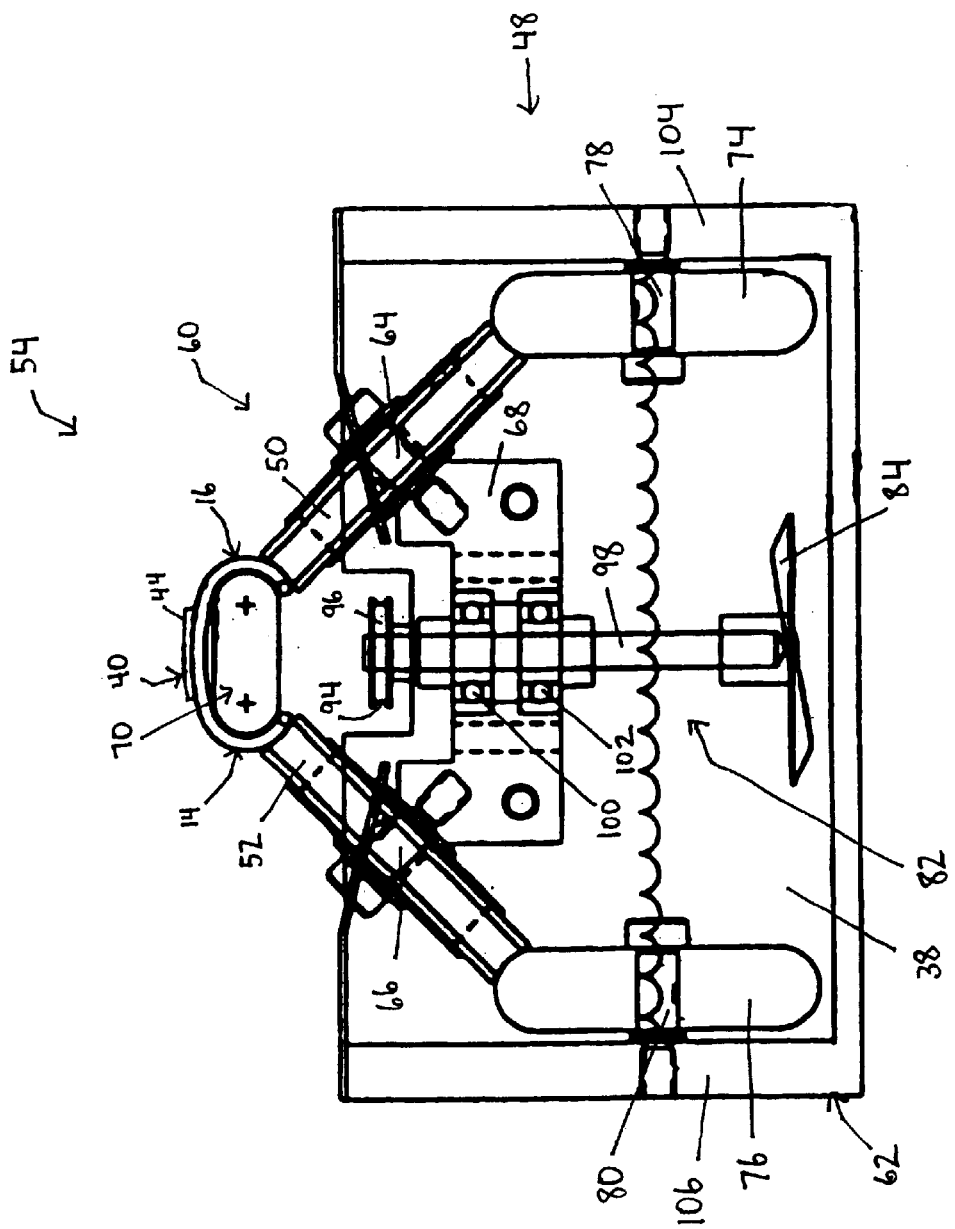
FIG. 6 is a front view of the apparatus of FIG. 5.

FIGS. 5–6 show an apparatus, shown generally at 54, for applying the lubricant 38 to the adhered row of abutting open ring fasteners 10 cut into predetermined lengths, in the form of the package 40. A guide structure, shown generally at 56, extending from the predetermined final path 25, guides the package 40 past the lubricant applying station 48. The guide structure 56 extends generally horizontal and supports the package 40 on interior surfaces of the fasteners 10 thereof with the spaced free ends 14, 16 extending downwardly. The packages 40 move from right to left from the adhering structure 46 as shown in FIG. 6 and indicated by an arrow 58. Certain packages 40 in FIG. 5 have been removed to more clearly show such structures as the guide structure 56 and the final path 25. It is preferable that the packages 40 be in abutting relation as they move out of the mechanism 46 and along the final path 25.

A lubricant applying assembly, shown generally at 60, at the lubricant applying station 48 has structure to apply a wet solution of the lubricant 38 as a thin film on exterior surfaces 15, 17 of the pair of spaced curved free ends 14, 16 of the fasteners 10 as they move past the assembly 60 while still at the elevated temperature condition which aids in drying the lubricant 38.

The lubricant applying assembly 60 includes the pair of lubricant applying rollers 50, 52 that are disposed in rolling engagement with the exterior surfaces 15, 17 of the free ends 14, 16 of the fasteners 10 and operatively associated with a lubricant reservoir, generally indicated at 62, containing the lubricant 38 consisting of the molybdenum disulfide placed in suspension by odorless mineral spirits. The rollers 50, 52 are rotatably mounted on shafts 64, 66 supported by a mounting structure 68. As the lubricant applying rollers 50, 52 are rotated by the movement of the package 40, the lubricant 38 supplied by the reservoir 62 is applied to the exterior surfaces 15, 17 of the free ends 14, 16. The applying rollers 50, 52 deformably flatten when engaging the fastener 10 to apply the lubricant 38 to the exterior surface 15, 17 of the free ends 14, 16. The exterior surfaces 15, 17 of the free ends 14, 16 of the fastener 10 is the area that generates most of the friction applied to the tool jaws of the crimping tool during ring closure, as described in the background section.

The guide structure 56 further includes a pivoting free end portion, shown generally at 70, that is configured and positioned such that the weight of the packages 40 thereon pivots the portion 70 downwardly about a pivoting point 72 to maintain rolling engagement of the exterior surfaces 15, 17 of the free ends 14, 16 with the lubricant applying rollers 50, 52 spaced below.

A pair of spaced opposed pick-up rollers 74, 76 have their lower halves immersed in the lubricant 38 contained in the reservoir 62. The pair of rollers 74, 76 are each rotatable about a horizontal axis and disposed in lubricant transferring rolling engagement with the lubricant applying rollers 50, 52. The pick-up rollers 74, 76 are rotatably mounted on shafts 78, 80 supported by walls 104, 106 of the reservoir 62. As the applying rollers 50, 52 rotate, this movement is applied to the pick-up rollers 74, 76. As the pick-up rollers 74, 76 rotate in unison with the applying rollers 50, 52, a coating of lubricant 38 is taken from the reservoir 62 and applied to the applying rollers 50, 52 and then to the package 40 moving along the guide structure 56. It is also contemplated that the pick-up rollers 74, 76 are simply not provided and the applying rollers 50, 52 are directly disposed in the reservoir 62 therein.

The reservoir 62 includes an agitation device, shown generally at 82 having a rotatable agitator 84 immersed therewithin. A power operated belt drive system, shown generally at 86 is constructed and arranged to rotate the agitator 84 about a vertical axis to stir a supply of lubricant 38 in the reservoir 62. The system 86 includes a motor 88 having an output shaft 90 and a drive pulley 92 that is interconnected by a belt 94 to an idler pulley 96. The idler pulley 96, mounted to one end of a shaft 98, rotates the agitator 84 mounted at the other end of the shaft 98. The shaft 98 is journaled by bearings 100, 102 within the mounting structure 68. It is also contemplated that the agitator 84 be rotated by a gear drive assembly.

It can thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

What is claimed is:

1. A fastener for use with a crimping tool comprising:

a length of fastener metal wire bent into a generally C-shaped configuration to form an open ring fastener including:

spaced opposed curved free end portions integrally interconnected by a central connecting portion;

said open ring fastener being constructed and arranged to be (1) positioned in an installation position with respect to elongated elements to be connected together disposed between the spaced opposed free ends thereof, and (2) crimped by a pair of closing jaws of the crimping tool into a close ring formation in surrounding relation to the elongated elements wherein said free ends are lapped with respect to sections of said connecting portion;

said open ring fastener having a dry lubricant film on exterior surfaces of said curved free ends which slide with respect to the closing jaws when said open ring fastener is crimped so as to reduce the force required to effect the crimping movement;

said central connecting portion of said open ring fastener including an exterior surfaces devoid of said lubricant.

2. A fastener according to claim 1 wherein said lubricant is applied only on exterior surfaces of said curved free ends.

3. A fastener according to claim 2 wherein said lubricant includes molybdenum disulfide placed in suspension by odorless mineral spirits.

4. A fastener according to claim 3 wherein said central connecting portion is arcuate and supported by a support structure of said crimping tool to prevent said fastener from deforming through the crimping movement.

5. A fastener according to claim 4 wherein said spaced opposed curved free end portions have oppositely angled end surfaces.

6. A fastener according to claim 1 wherein said lubricant includes molybdenum disulfide placed in suspension by odorless mineral spirits.

7. A fastener according to claim 1 wherein said central connecting portion is arcuate and supported by a support structure of said crimping tool to prevent said fastener from deforming through the crimping movement.

8. A fastener according to claim 1 wherein said spaced opposed curved free end portions have oppositely angled end surfaces.

9. A fastener package comprising:

a row of abutting open ring fasteners each formed of a length of fastener metal wire bent into a generally C-shaped configuration including spaced opposed curved free end portions integrally interconnected by a central connecting portion;

structure adhering said row of open ring fasteners in abutting relation so as to be fed in the direction of the row along a crimping tool feed track to present a leading open ring fastener for crimping between closing crimping tool jaws into a closed ring formation wherein the free ends are lapped with respect to sections of said connecting portion;

said row of open ring fasteners having a dry lubricant film on exterior surfaces of the curved free ends of the fasteners of said row;

said adhering structure being secured to exterior surfaces of said row of open ring fasteners which are devoid of said lubricant.

10. A fastener package according to claim 9 wherein said lubricant is applied only on exterior surfaces of said curved free ends.

11. A fastener package according to claim 10 wherein said lubricant includes molybdenum disulfide placed in suspension by odorless mineral spirits.

12. A fastener package according to claim 11 wherein said central connecting portion is arcuate and supported by a support structure of said crimping tool to prevent said fastener from deforming through the crimping movement.

13. A fastener package according to claim 12 wherein said adhering structure comprises a tape bonded to the exterior surfaces of the connecting portions of said row of fasteners.

14. A fastener package according to claim 13 wherein said spaced opposed curved free end portions have oppositely angled end surfaces.

15. A fastener package according to claim 9 wherein said lubricant includes molybdenum disulfide placed in suspension by odorless mineral spirits.

16. A fastener package according to claim 9 wherein said central connecting portion is arcuate and supported by a support structure of said crimping tool to prevent said fastener from deforming through the crimping movement.

17. A fastener package according to claim 9 wherein said adhering structure comprises a tape bonded to the exterior surfaces of the connecting portions of said row of fasteners.

18. A fastener package according to claim 9 wherein said spaced opposed curved free end portions have oppositely angled end surfaces.

* * * * *

UNITED STATES PATENT AND TRADEMARK OFFICE
CERTIFICATE OF CORRECTION

PATENT NO.   : 6,408,489 B1                                     Page 1 of 1
DATED        : June 25, 2002
INVENTOR(S)  : Raymond F. Cluggish It is certified that error appears in the above-identified patent and that said Letters Patent is hereby corrected as shown below:

<u>Title page,</u>
Item [73], Assignee, replace "ASML Netherlands B.V., Veldhoven (NL)" with
-- Stanley Fastening Systems, LP, East Greenwich (RI) --.

Signed and Sealed this

Eighteenth Day of November, 2003

JAMES E. ROGAN
*Director of the United States Patent and Trademark Office*